US008789133B2

(12) United States Patent
Kuhlke et al.

(10) Patent No.: US 8,789,133 B2
(45) Date of Patent: Jul. 22, 2014

(54) LOCATION BASED CONTENT FILTERING AND DYNAMIC POLICY

(75) Inventors: Matthew Robert Kuhlke, San Francisco, CA (US); Alan Darryl Gatzke, Bainbridge Island, WA (US)

(73) Assignee: Cisco Technology, Inc., San Jose, CA (US)

( * ) Notice: Subject to any disclaimer, the term of this patent is extended or adjusted under 35 U.S.C. 154(b) by 126 days.

(21) Appl. No.: 13/090,939

(22) Filed: Apr. 20, 2011

(65) Prior Publication Data

US 2012/0272287 A1 Oct. 25, 2012

(51) Int. Cl.
*G06F 17/00* (2006.01)
(52) U.S. Cl.
USPC ............................................................. 726/1
(58) Field of Classification Search
USPC ............................................................. 726/1
See application file for complete search history.

(56) References Cited

U.S. PATENT DOCUMENTS

| 8,219,028 | B1 * | 7/2012 | Flamholz | 455/41.2 |
|---|---|---|---|---|
| 2007/0162569 | A1 * | 7/2007 | Robinson et al. | 709/219 |
| 2009/0144258 | A1 * | 6/2009 | Taylor | 707/5 |
| 2012/0123779 | A1 * | 5/2012 | Pratt et al. | 704/235 |

OTHER PUBLICATIONS

Konstantinous Kleisouris, Detecting intra-room mobility with signal strenght descriptors, Sep. 2010, ACM.*

Christian Decker, Proximity as a security property in a mobile enterprise application context, 2004, IEEE Conference Publication.*
D. Olguín, et al. *Sensor-based organisational design and engineering*, International Journal of Organisational Design and Engineering, vol. 1, No. 1/2, pp. 69-97, 2010.
D. Olguin, et al., *Sensible Organizations: Technology and Methodology for Automatically Measuring Organizational Behavior*, IEEE Transactions on Systems, Man, and Cybernetics—Part B: Cybernetics, vol. 39, No. 1, Feb. 2009.
B. Waber, et al., Understanding Organizational Behavior with Wearable Sensing Technology, Academy of Management Annual Meeting, Anaheim, CA, Aug. 2008.
L. Wu, et al., *Mining Face-to-Face Interaction Networks using Sociometric Badges: Predicting Productivity in an IT Configuration Task*, In Proceedings of the International Conference on Information Systems, Paris, France, Dec. 14-17, 2008.

(Continued)

*Primary Examiner* — Kambiz Zand
*Assistant Examiner* — Gita Faramarzi
(74) *Attorney, Agent, or Firm* — Brinks Gilson & Lione

(57) ABSTRACT

In one implementation, a social media device receives social interaction data including an identity of neighboring mobile devices that have been within a physical proximity of an object mobile device. The social media device hosts a social network service and provides content to a user associated with the object mobile device according to the identity of more neighboring mobile devices. The user of the object mobile device may opt to receive content only from those users that are identified in the social interaction data. The user of the object mobile device may opt to permit only those users that are identified in the social interaction data to receive content generated by the user of the object mobile device. The user may opt to alter the status policy seen by other users so that only users that are identified in the social interaction data see the user as available or online.

18 Claims, 8 Drawing Sheets

(56) References Cited

OTHER PUBLICATIONS

B.N. Waber, et al., *Productivity through Coffee Breaks: Changing Social Networks by Changing Break Structure*, 30th International Sunbelt Social Network Conference, Riva del Garda, Italy, Jul. 2, 2010.

D. Olguin, et al., *Capturing Individual and Group Behavior with Wearable Sensors*, Human Behavior Modeling, AAAI Spring Symposium. Palo Alto, CA, Mar. 2009.

D. Olguin, *Assessing Group Performance from Collective Behavior*, Submitted to: CSCW 2010 Workshop on Collective Intelligence in Organizations, Savannah, GA, Feb. 6, 2010.

T. Kim, et al., *Meeting Mediator: Enhancing Group Collaboration and Leadership with Sociometric Feedback*, In Proceedings of the ACM Conference on Computer Supported Cooperative Work, San Diego, CA, Nov. 2008.

T. Kim, et al., *Sensor-Based Feedback Systems in Organizational Computing*, Workshop on Social Computing with Mobile Phones and Sensors. In conjunction with the 2009 IEEE International Conference on Social Computing. Vancouver, BC, Aug. 2009.

A. Pentland, *To Signal is Human*, American Scientist, Abstract, vol. 98, No. 3, May-Jun. 2010.

A. Pentland, et al. *Computational Social Science*, Science, vol. 323, Feb. 2009.

D. Olguin, et al., *Sociometric Badges: State of the Art and Future Applications*, IEEE 11$^{th}$ International Symposium on Wearable Computers, Oct. 2007.

M. Terry, et al., *Social Net: Using Patterns of Physical Proximity Over Time to Infer Shared Interests*, Everyday Computer Lab, GVU Center College of Computer, Georgia Tech, Atlanta, GA, Accessed Aug. 16, 2010.

* cited by examiner

LOCATION BASED CONTENT FILTERING AND DYNAMIC POLICY

FIELD

The present embodiments relate to location based content filtering and dynamic policy in a social network.

BACKGROUND

Now with over 300 million users, the social networking industry has grown exponentially for several years. The amount of content generated by other users that any particular user is subjected to has similarly grown. Social networking sites provide only crude tools to limit the content. For example, users are given the opportunity to elect to remove content of particular users or block certain users from viewing content.

However, manual election of specific users is difficult and time consuming. As the amount of content grows rapidly it becomes increasingly difficult for a user to monitor and select the appropriate contacts with which the user would like to share content, and avoid accidently exposing content to the wrong individuals.

DETAILED DESCRIPTION

Overview

Figure 1:
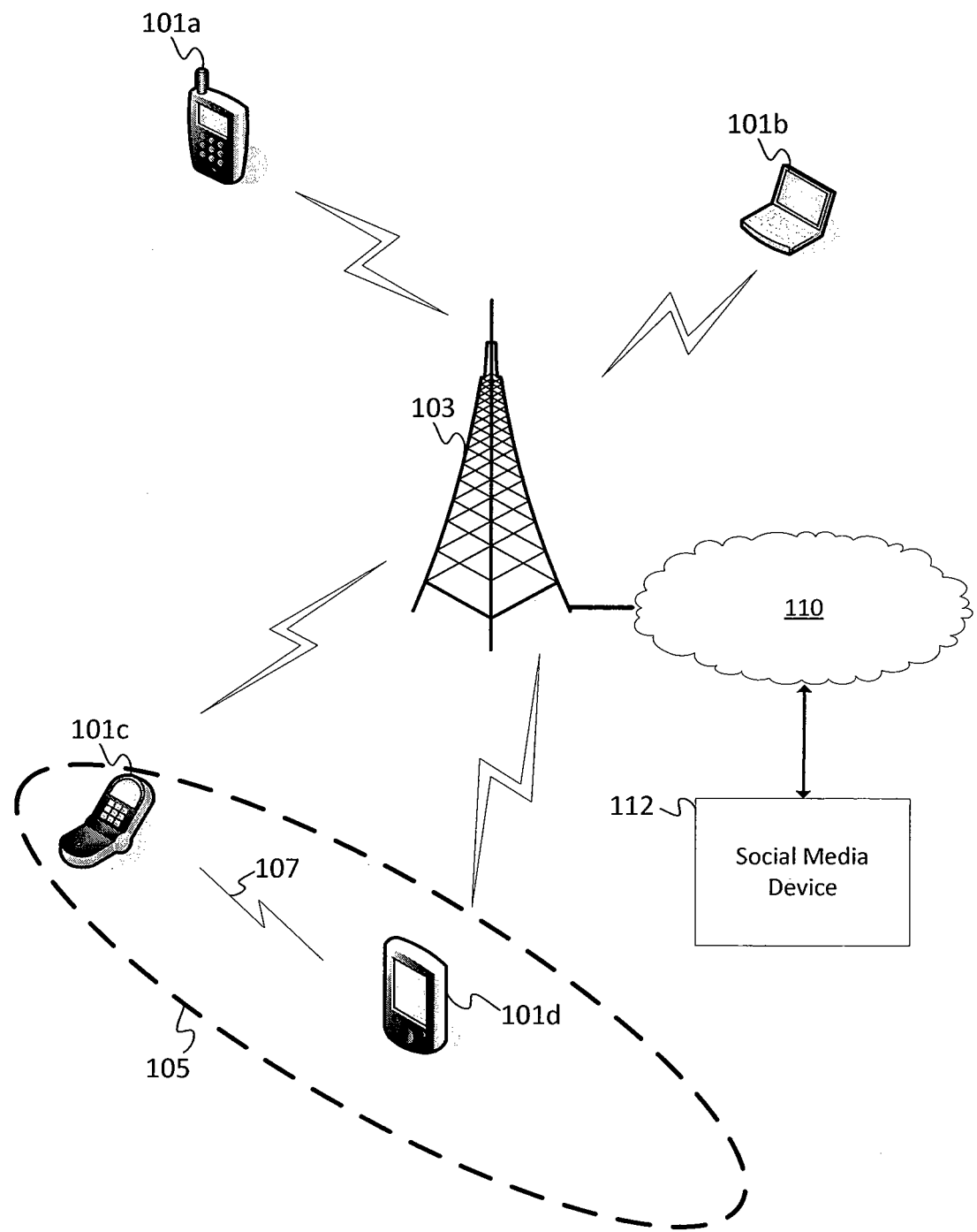
FIG. 1 illustrates one embodiment of a communication system including a social media device.

A social media device receives social interaction data including an identity of neighboring mobile devices that have been within a physical proximity of an object mobile device. The social media device hosts a social network service and provides content to a user associated with the object mobile device according to the identity of more neighboring mobile devices. The user of the object mobile device may opt to receive user-generate content only from those users included in the social interaction data. The user of the object mobile device may opt to permit only those users included in the social interaction data to receive content generated by the user of the object mobile device. The user may opt to alter the status policy seen by other users so that only users included in the social interaction data see the user as available for real time communication.

In one aspect, a method includes storing a list of social media contacts, receiving social interaction data at a controller including an identity of one or more neighboring mobile devices that have been within a physical proximity of an object mobile device, matching the identity of one or more neighboring mobile devices to the list of social media contacts, and transmitting social media content to a user associated with the object mobile device according to the identity of the one or more neighboring mobile devices matched with the list of social media contacts.

In a second aspect, an apparatus includes a memory storing social media content associated with a user, and a controller configured to receive social interaction data including an identity of one or more neighboring mobile devices that have been within a physical proximity of a mobile device associated with the user, and filter the social media content associated with the user according to the identity of the one or more neighboring mobile devices.

In a third aspect, a non-transitory computer readable medium is encoded with software operable to receive location data from a plurality of mobile devices, calculate social interaction data for the plurality of mobile devices according to a time each of the plurality of mobile devices has been within a predetermined distance of another of the plurality of mobile devices, and provide content to a user associated with one of the plurality of mobile devices according to the social interaction data.

EXAMPLE EMBODIMENTS

A social networking device or social media host uses real world social interaction data about a user to manipulate, display or otherwise generate content for the user with respect to one or more social networking media. The real world social interaction data describes the user's interaction with other users. The social networking device may filter content for the user so that content displayed to the user includes only that content which is associated with other users (contacts) that the user interacts with in the real world. The real world is everything that is not online. The total users or contacts include online only contacts and real world contacts. The social network device may limit the content from the user provided to the contacts such that only those contacts that the user interacts with in the real world have access to content from the user. The social network device may alter the status policy for the user such that contacts that the user interacts with in the real world see a different online status for the user than contacts that the user does not interact with in the real world.

The social interaction data utilized by the social networking device may be received by one or more mobile devices associated with the user and/or the other users. The social interaction data may be generated internally by the social networking device. In some implementations, the mobile device of the user may detect other mobile devices in proximity. Alternatively, the user may manually input data indicative of real world interactions into the mobile device. Real world interaction or real world communication are any interaction or communication that occur without the Internet. In still other implementations, the social networking device may receive location data from mobile devices and calculate social interaction data from the location data.

Users may have difficulty sorting large quantities of new content on social media to access the smaller amount of content immediately relevant to them. The social networking device allows a user to sort the content based on the social interaction data. That is, the social networking device may display only the content associated with other users that the user interacts with in the real world.

The social networking device may also improve the flexibility available to users in restricting the content that is shared with other users. For example, rather than limiting which groups can view certain content with settings such as "friends" or "friends of friends," the social networking device permits settings such as "friends that I have recently interacted with." Such a setting would dynamically change the content policy associated with the user as the user's real world interactions change over time.

The social networking device may also dynamically change the online status or availability associated with a user and broadcast this information to other users. The online status or availability indicates to other users when the user is capable of receiving instant messages or chat requests. For example, rather than broadcasting "available" or "online" to other users when a user has logged into the social networking service, the social networking device may limit the online or availability indication to only those users with which the user has recently interacted with in the real world.

The social networking device may enable other features according to the real world social interaction data. For example, the social networking device may compile a guest list for a party or other event based on the users with which the user has recently interacted with in the real world. The social networking device may also permit database searches according to the social interaction data. For example, the social networking device may prioritize a search result list for documents in a corporate database according to authors that are users that the searching user has interacted with.

Social media hosts provide social network services. A social network service may be any service in which the content is generated by the users. Many social network services are websites accessed through a uniform resource locator (URL). Social network services may include a "profile" or "page" for each user to add content, and each user shares the user's profile or page with other users. Some profiles are public and accessible by anyone, while others are private and accessible only by selected other users, which may be referred to as friends or contacts.

FIG. 1 illustrates one embodiment of a communication system including a social media device 112. The communication system also includes a plurality of mobile devices 101a-d, a wireless communication device 103, and a network 110. The mobile devices may include any number of a smart phone 101a, a laptop computer 101b, a cellular phone 101c, personal digital assistant or tablet computer 101d, and/or any other data communication device. The wireless communication device 103 may communicate with the mobile devices 101a-d using cellular, 3G, 4G, Wi-Fi, or other technologies.

The mobile devices 101a-d may collect social interaction data and send the social interaction data to the social media device 112. The collection of the social interaction data may occur in a variety of implementations. In some implementations, the mobile devices 101a-d may detect one another when one mobile device comes within a predetermined distance of another mobile device. The predefined distance may be an area 105 that defines a proximity to one of the mobile devices 101a-d. The predetermined distance may be any distance (e.g., 1 meter, 10 feet, 100 feet, 1 mile, 10 miles or another distance). Alternatively, the predetermined distance may be estimated based on a strength of a communication signal 107. That is, the mobile devices 101a-d may detect one another when one mobile device receives a signal strength from another mobile device above a threshold signal strength. The threshold signal strength may correspond to an estimate predetermined distance between the mobile devices. The threshold signal strength may be a minimum measurable signal strength such that when a mobile device detects another mobile device at any signal strength, the two mobile devices are within the predetermined distance.

Collection of the social interaction data may utilize a variety of technologies. The mobile device 101a-d may be configured with a Bluetooth communication capability such that the communication signal 107 is a Bluetooth signal. Bluetooth is an example of an ad hoc network standard, but in other examples any other communication protocol may be used. Possible implementations may include a threshold signal strength of 1 mW at an approximate predetermined distance between mobile devices of 1 meter (class 3), a threshold signal strength of 2.5 mW at an approximate predetermined distance between mobile devices of 10 meters (class 2), or a threshold signal strength of 100 mW at an approximate predetermined distance between mobile devices of 100 meters (class 1). In addition or in the alternative, the mobile devices 101a-d may detect one another using infrared communication.

Alternatively or in addition, the communication signal 107 may be radio frequency identification (RFID) signal. The mobile devices 101a-d may be equipped with passive RFID or active RFID. In active RFID, a mobile device includes both an RFID reader (interrogator) and an RFID tag (label). The RFID reader is configured to detect nearby RFID tags of other mobile devices. Each RFID tag includes data indicative of the identity of a user associated with the mobile device. The RFID tag may receive energy from the RFID reader, which triggers a communication signal that is detected by the RFID reader. Alternatively, the RFID tag may be powered by the power supply of the mobile device. The RFID reader interprets the communication signal to determine the identity of the mobile device. The RFID tag may also include a battery configured to supply power to produce the communication signal. In another implementation, the mobile devices 101a-d may utilize passive RFID, which is discussed below.

In other implementations, a network device may collect social interaction data and send the social interaction data to the social media device 112. Alternatively, the network device may collect location data, in which case the social media device 112 is configured to calculate the social interaction data from the location data. The network device may be configured to communicate with all mobile devices within a predefined distance (e.g., 1 meter, 10 feet, 100 feet, 1 mile, 10 miles or another distance) or within a signal range.

Figure 2:
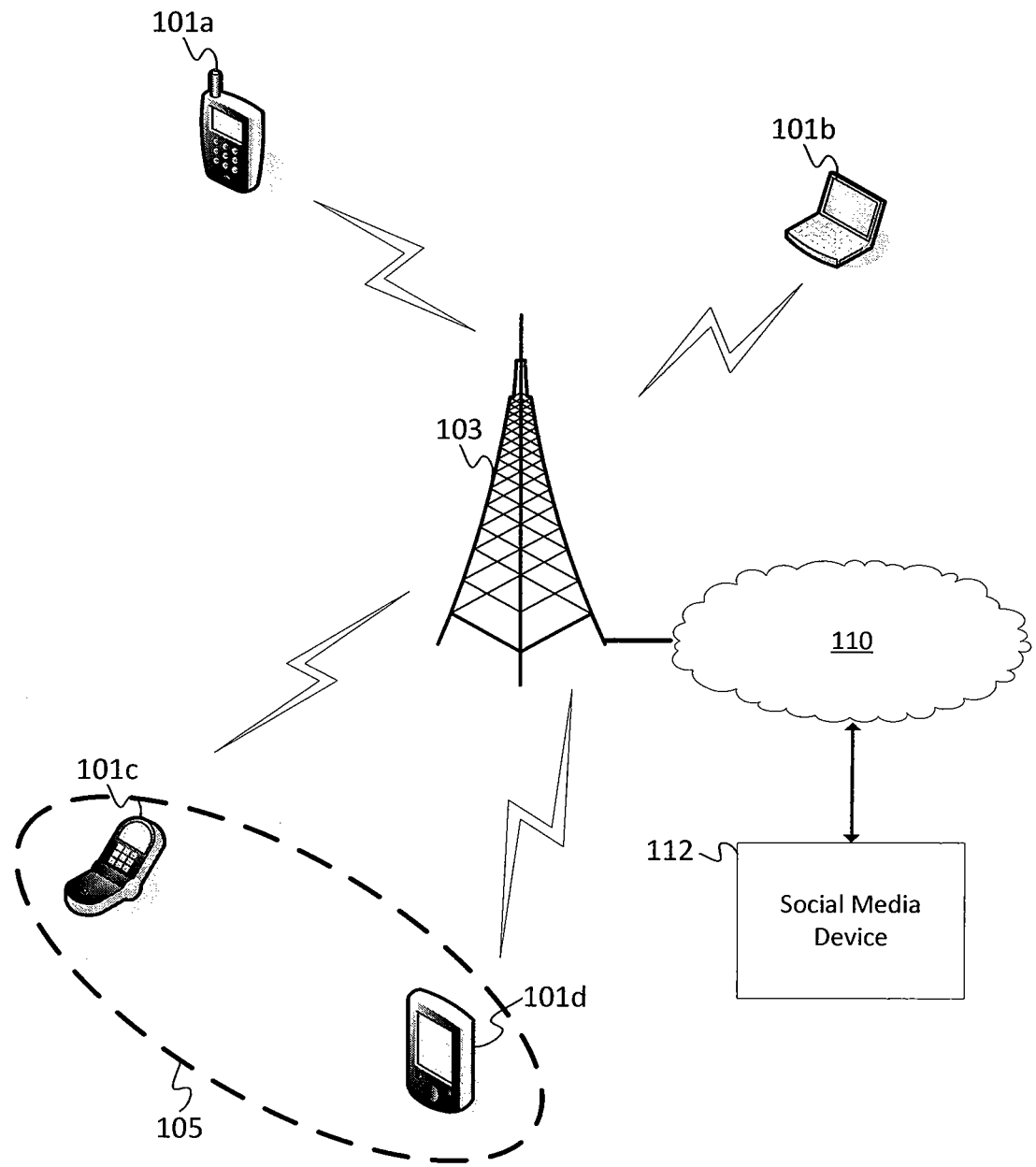
FIG. 2 illustrates another embodiment of a communication system including a social media device.

FIG. 2 illustrates one embodiment of a communication system including a social media device 112, a plurality of mobile devices 101a-d, a wireless communication device 103, and a network 110. The mobile devices may include any number of a smart phone 101a, a laptop computer 101b, a cellular phone 101c, and/or personal digital assistant or tablet computer 101d. The wireless communication device 103 may be long range or short range. In long range applications, as shown in FIG. 2, the wireless communication device 103 may be a cellular tower or a microwave access point such as WiMAX.

The wireless communication device 103 may derive the location of one or more of the mobile devices 101a-d through the existence of communication with the mobile devices 101a-d. That is, mobile devices 101a and 101b may be considered in the same location or near one another because they are both in communication with the wireless communication device 103. In addition or in the alternative, a plurality of wireless communication devices may be used to determine a more detailed location of one or more of the mobile devices 101a-d using triangulation using signals received at the plurality of wireless communication devices. As shown in FIG. 2, the wireless communication device 103 or the social media device 112 may determine that mobile device 101a and mobile device 101d are in a proximity defined by area 105 using the signal strength determined by one or more wireless communication devices or determine that the mobile devices 101a-d are in a proximity defined by the range of the wireless communication device 103.

The mobile devices 101a-d may also generate location data. For example, one or more of the mobile devices 101a-d may be equipped with a global positioning system (GPS) application that generates location data and communicates the location data to the social media device 112 by way of the wireless communication device 103 and network 110. As shown in FIG. 2, the wireless communication device 103 or the social media device 112 may determine that mobile device 101a and mobile device 101d are in a proximity defined by area 105 using GPS data determined at the mobile devices 101a-d.

Figure 3:
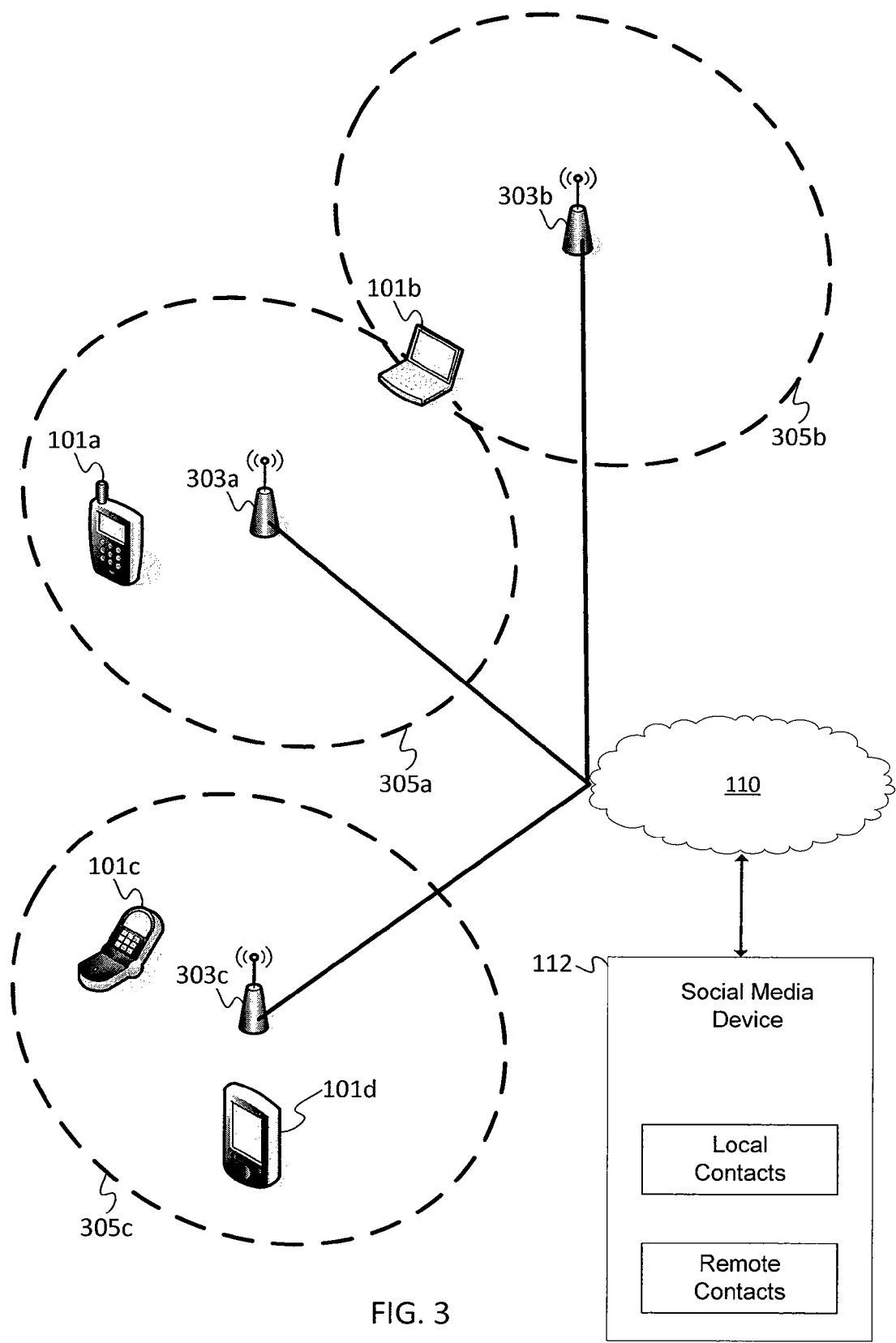
FIG. 3 illustrates another embodiment of a communication system including a social media device.

FIG. 3 illustrates one embodiment of a communication system including a social media device 112, a plurality of mobile devices 101a-d, wireless communication devices 303a-c, and a network 110. The mobile devices may include any number of a smart phone 101a, a laptop computer 101b, a cellular phone 101c, and/or personal digital assistant or tablet computer 101d. The wireless communication devices 303a-c may be short range such as Wi-Fi access points. Each access point 303a-c may define an area 305a-c. Each access point may generate location data used to determined social interaction data by virtue of the mobile devices connected to the access point. For example, access point 303c may communicate location data for mobile device 101c and location data for mobile device 101d that indicates mobile devices 101c and 101d are within range of the access point 303c or within the area 305c. A mobile device may be located in areas corresponding to two access points. For example, mobile device 101a is within range of access point 303a and access point 303b.

Alternatively, the wireless communication devices 303a-c may be RFID readers. In this implementation, the mobile devices 101 employ passive RFID tags, which require no power source within the mobile device. Instead, the wireless communication devices 303a-c are configure to energize the RFID tags, which produce a signal including data indicative of the identity of users of the mobile devices 101a-d.

In any of the above implementations, the detection may be automatic. That is, the detection of one mobile device by another, the detection of one or more mobile devices by the wireless communication device, or the detection of location data by one or more mobile devices may occur without user intervention. The detection may be periodic or in response to a function of the device such as a power sequence or a communication handoff between adjacent wireless communication devices. However, in the alternative or in addition, the detection may be initiated by the user. In this type of "push to tag" system, the user may enter an input to the mobile device that causes the mobile device to detect other nearby mobile devices, causes a signal to be sent to the wireless communication device to collect location data from the mobile devices within range, or causes location data to be collected at the mobile device and sent to the social media device 112.

In any of the above implementations, the social interaction data is used to control the access to data and/or status policies of one or more users associated with the mobile devices 101a-d. The social media device 112 may use the social interaction data to divide the contacts of a user into local contacts and remote contacts. The local contacts may be those users that the user has interacted with in the real world, as described by the social interaction data, a predetermined number of times within a predetermined time period. The number of times may be once or any integer number of times. The predetermined time period may be 1 day, 1 month, 1 year, or an infinite amount of time. The remote contacts may be those users that the user has interacted with only in the online world or users that the user has interacted with only in the online world for the predetermined time period.

The list of remote contacts and list of local contacts is updated by the social media device 112 periodically or constantly. As shown by FIG. 3, the social media device 112 may store a database entry for the list of local contacts and a database entry for the list of remote contacts for each of the users of the social network. The social media device 112 manages the database by moving users from the list of remote contacts to the list of local contacts according to the social interaction data. When the social interaction data indicates that user A has been within a physical proximity of user B, the social media device 112 may move user A from the remote contact list of user B to the local contact list of user B.

Figure 4:
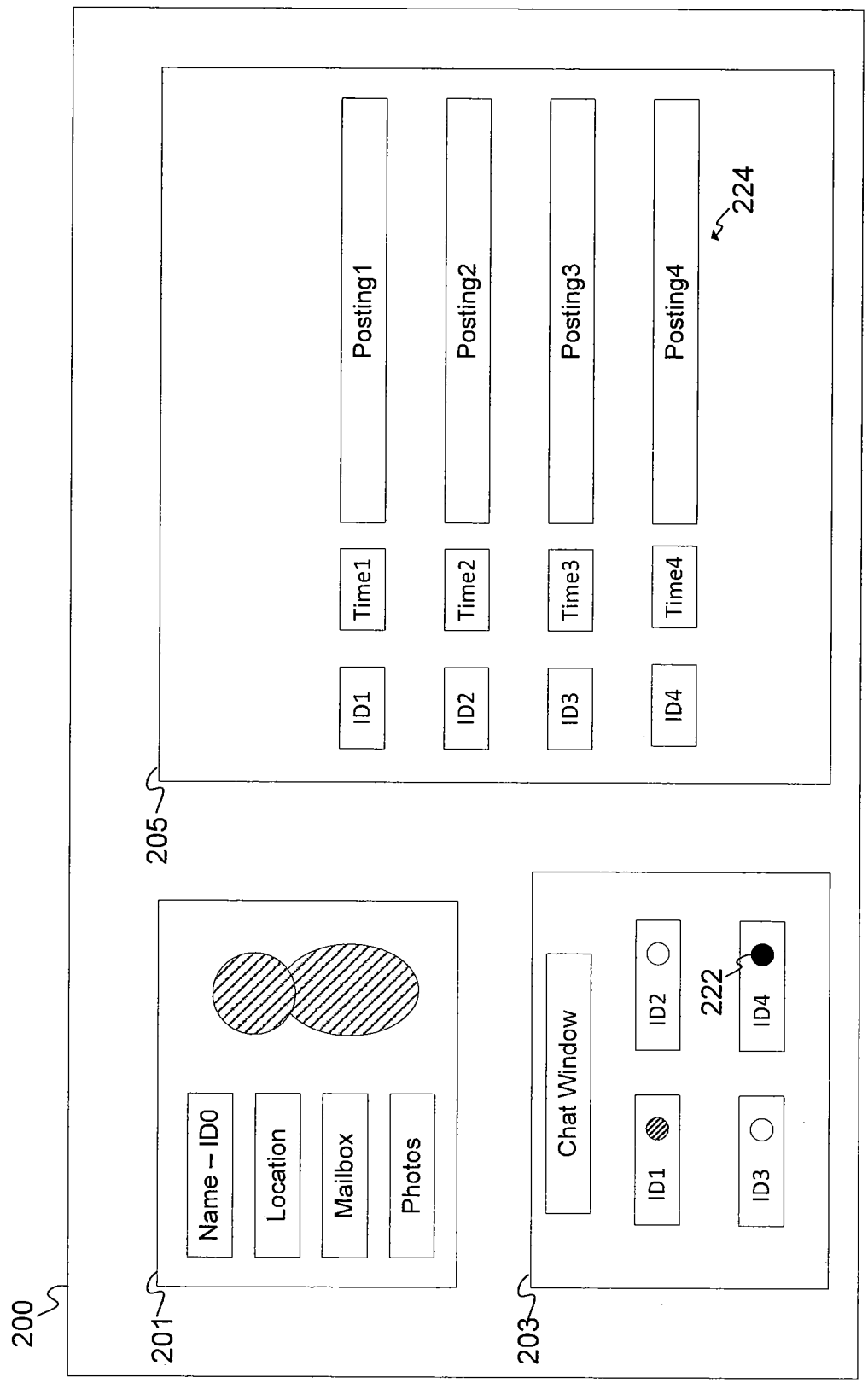
FIG. 4 illustrates an example of social media display.
Figure 5:
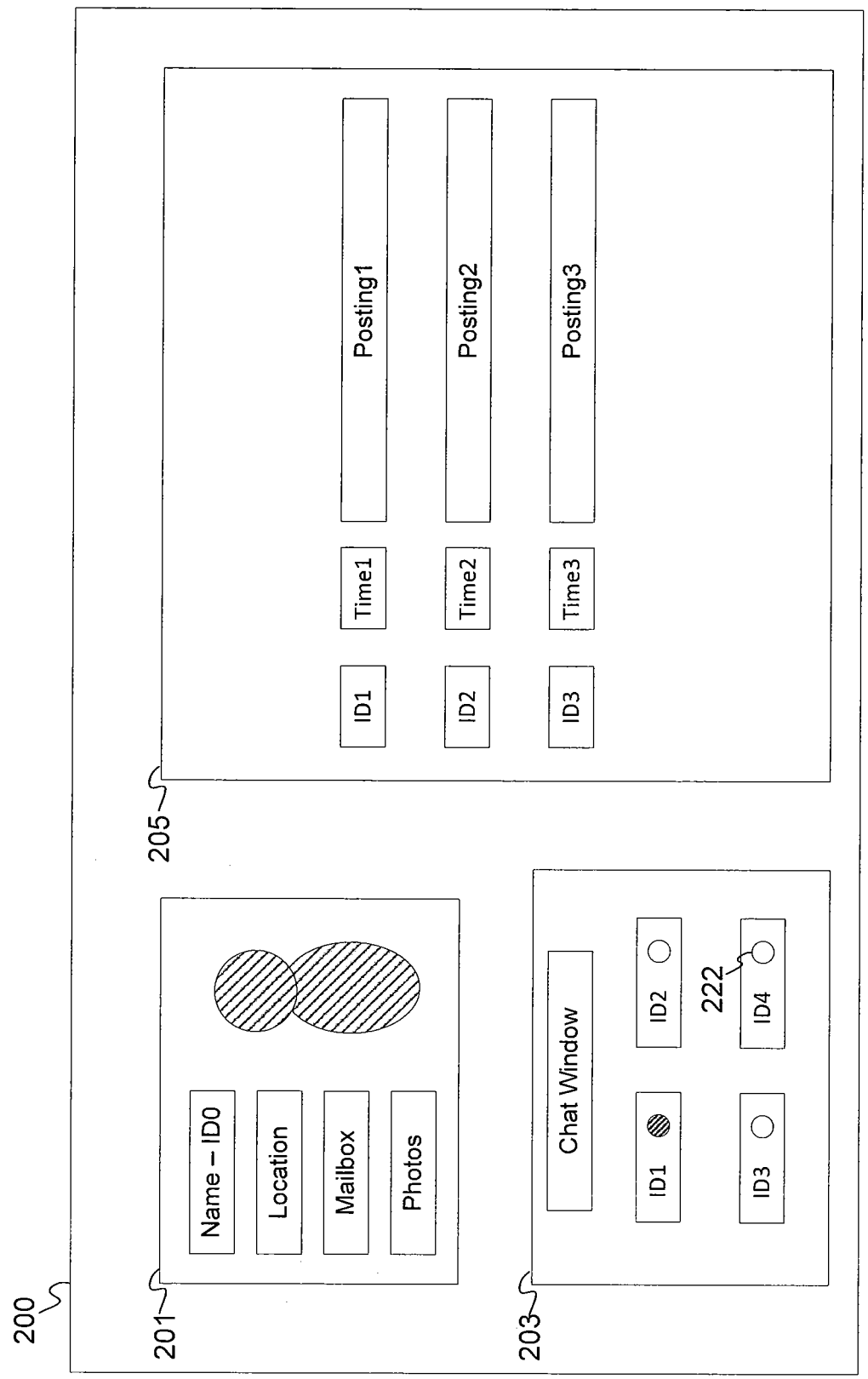
FIG. 5 illustrates another example of the social media display with dynamic content filtering and status policy.

FIGS. 4 and 5 illustrate an example of social media display 200. The social media device 112 may generate social media data which is transmitted to one or more of the mobile devices 101a-d, which generates the social media display 200. The social media display 200 may be generated and displayed on any computer used to access the social networking profile of the user from the social media device 112. The social media display 200 may include account data 201, chat data 203, and news feed 205.

The social media display 200 shown in FIGS. 4 and 5 is associated with a user with an identity (ID0). The account data 201 may include the name of ID0, a location, a mailbox link, and a photos link. Additional or less information may be included in the account data 201. The chat data 203 may list all of the contacts or friends of the user ID0 using chat icons. The chat icons may indicate whether the other users are logged off, available, idle, or busy. In the example of FIG. 4, user ID2 and user ID3 are logged off, user ID1 is idle, and user ID4 is available. The news feed 205 may include a plurality of postings. Each posting may include the user ID of the associated user, a timestamp, and a posting content.

In FIG. 4, the user ID0 (or a mobile device associated with user ID0) has interacted in the real world with all of the other users shown, users ID1, ID2, ID3, and ID4. In FIG. 5, the social network device 112 has identified that user ID0 (or a mobile device associated with user ID0) has interacted in the real world with only users ID1, ID2, and ID3 and not with user ID4. Accordingly, the social media display 200 of FIG. 5 reflects these relationships.

For example, the news feed 205 includes content associated with users ID1, ID2, and ID3 but not content 224 associated with user ID4. When compared with FIG. 4, the user ID0 of FIG. 5 no longer has to sort through content associated with user ID4. User ID4 may be a user that user ID0 has not seen in a long time or possibly never met (remote contact). User ID0 has chosen to see content only from other users he actually interacts with on a personal basis or face to face basis (local contact). Alternatively, a user could elect the opposite scenario. That is a user, may elect to see content only from other users that the user has not interacted with on a face to face basis. This may allow the user to keep up with old friends without sorting through content of local friends that the user talks to on a regular basis anyway. Each user may have the option to select that only "recently interacted friends" can see content associated with the user, or chose to see only content associated with "recently interacted friends." In addition, users may select "friends of recently interacted friends" or "friends my friends have recently interacted with" or both.

The social media display 200 may also include a chat window 203 with a status indicator 222 for user ID4 that indicates user ID4 is not available. Whether or not a user is available for communication through the social networking service may be referred to as the user's status policy and the settings that control the determination of the status polity may be referred to as the status policy settings. For example, a user could have a status policy setting that caused the social media device 112 to always show all other users that the user was unavailable.

The status policy settings for user ID0 have been dynamically changed based on the social interaction data. Because user ID4 has not interacted in the real world with user ID0 for a predetermined amount of time, the social media device 112 has changed the status of user ID4 as displayed to user ID0. In addition, the status of user ID0 as displayed to user ID4 may be changed. Each user may have the option to appear offline to people who they rarely interact with face to face.

Figure 6:
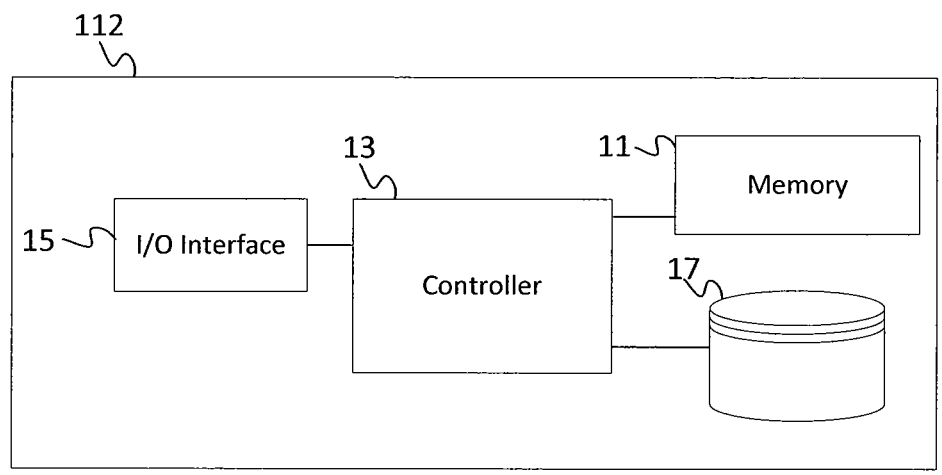
FIG. 6 illustrates an example of a social media device of FIG. 1 or FIG. 2.

FIG. 6 illustrates an example of a social media device 112. The social media device 112 may be one or more computer servers. The social media device 112 includes a controller 13, a communication interface 15, a memory 11, and a database 17. Using the example shown in FIGS. 2 and 3, one of the mobile devices 101a-d is considered an object mobile device. The controller 13 receives social interaction data by way of the communication interface 15. The social interaction data includes an identity of one or more neighboring mobile devices that have been within a physical proximity of an object mobile device. The social interaction data may be received from the mobile devices 101a-d or derived from location data received from the mobile devices 101a-d. Alternatively, the social interaction data may be derived from the existence of one or more of the mobile devices within the coverage area of the wireless communication device 112.

The memory 11 or database 17 stores a list of social media contacts associated with each user. The controller 13 may access content from database 17 and filter the content according to the social interaction data. For example, the controller 13 may match the identity or identities of neighboring mobile devices that have been within a physical proximity to the user and transmit content to the user according to the matched identities.

The controller 13 may limit the content associated with the user of the object mobile device such that only users associated with the neighboring mobile devices have access to the content associated with the user of the object mobile device. The controller 13 may limit the content that the user of the object mobile device can access so that only content associated with the users of the neighboring mobile devices can be accessed by the user of the object mobile device. In this way, when any of the users access the social network, the controller 13 provides the limited content so that the accessing device displays content to a user associated with the object mobile device according to the identity of one or more neighboring mobile devices.

The controller 13 may apply a policy to the content of the user associated with the object mobile device to limit access to users associated with the one or more neighboring mobile devices. Other users, those with the user associated with the object mobile device has not interacted with in the real world within a predetermined amount of time, do not have access to the content of the user of the object mobile device. The controller 13 may also alter the broadcasted status policy of the user associated with the object mobile device to change the status or limit those who receive the true status. For example, the controller 13, may communicate an available status of the object mobile device to users associated with the one or more neighboring devices, and communicate an unavailable status of the object mobile device to users not associated with the one or more neighboring devices.

The database 17 may be external to the social media device 112 or incorporated within the social media device 112. The database 17 may be stored with memory 11 or separately. The database 17 may be implemented as either hardware or software. The social media content may be stored by database 17 or memory 11.

Figure 7:
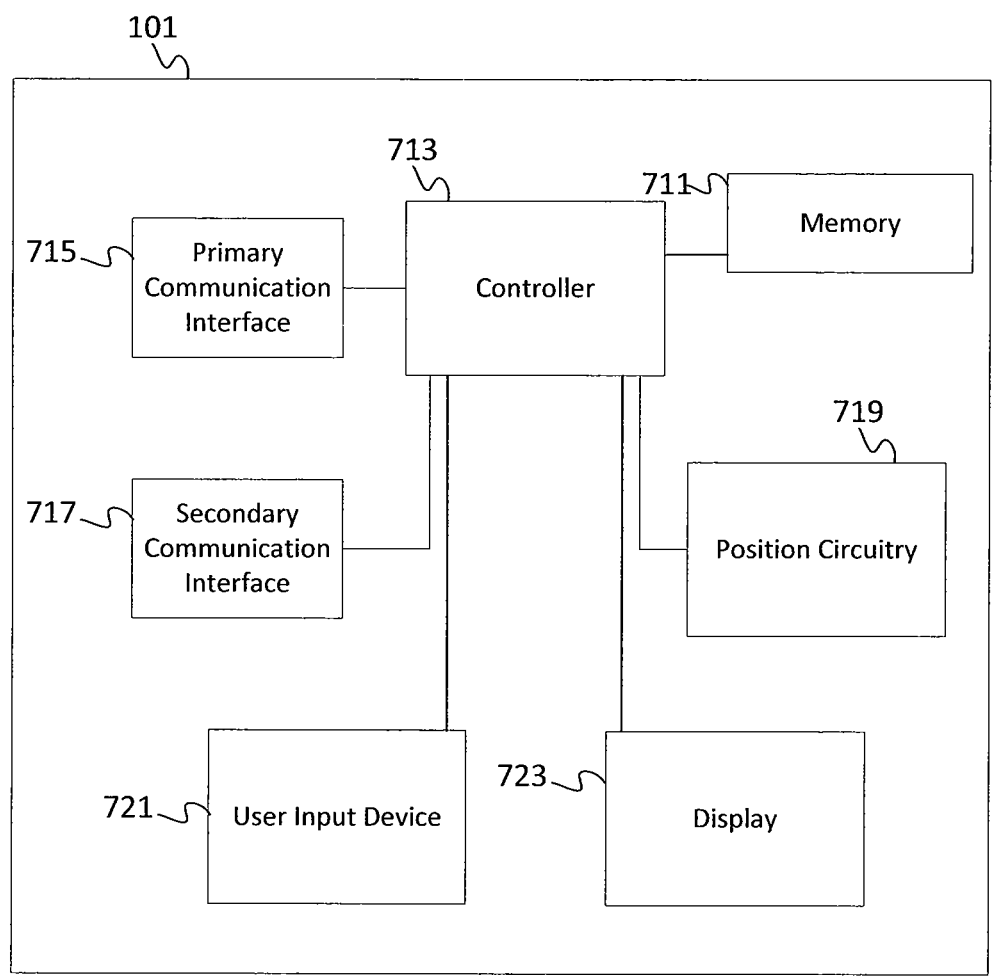
FIG. 7 illustrates an example of a mobile device of FIG. 1 or FIG. 2.

FIG. 7 illustrates an example of a mobile device 101. The mobile device 101 may correspond to any of mobile devices 101a-d of FIGS. 1 and 2. The mobile device 101 includes a memory 711, a controller 713, a primary communication interface 715, a secondary communication interface 717, position circuitry 719, a user input device 721, and a display 723.

The mobile device 101 may perform various functions in the described embodiments. As discussed above, the mobile device 101 may collect or generate the social interaction data when the controller 713 identifies the users in the proximity and filters content according to the identity of those users. In this scenario, the primary communication interface 715 is used to communicate to a cellular or computer network, and the second communication interface 717 is used to detect the location of the mobile device 101 or the existence of neighboring mobile devices. The secondary communication interface 717 may be configured with RFID, Bluetooth, IEEE 802.11 family, or other technologies.

In other implementations, the mobile device 101 may collect or generate location data. For example, position circuitry 719 may include a GPS algorithm for receiving satellite signals and determined location data based on the signals. The location data is communicated using the primary communication interface 715.

The controller 713 may include a timer to measure an amount of time each of the neighboring devices is within the physical proximity of the object mobile device. Alternatively, the timer may be implemented in the wireless communication device 103, 303 or the social media device 112.

The user input device 721 may allow the user to "push to tag" when a desired contact is in the proximity of the mobile device 101. For example, when the user associated with the mobile device 101 is in a room including people that the user desires to have access to content associated with the user on the social media device 112, the user inputs a command to the user input device 721. The command initiates the communication system to determine what other users are in the proximity of the mobile device 101. In one embodiment, the secondary communication interface 717 detects other mobile devices. In another embodiment, the wireless communication device 103, 303 determines the identities of the mobile devices in communication with the wireless communication device 103, 303. In another embodiment, the wireless communication device 103, 303 may request location data from all users to determine which mobile devices are in the proximity of the mobile device 101. The mobile device 101 may also be used to access the social media content from the social media device 112.

In addition to the location data, the controller 713 may also use email data, phone call history data, instant messenger data, and text message data to determine the social interaction data. The controller 713 may determine an aggregate social profile for the user associated with the mobile device 101 included weighted scores for email, calls, instant messages, and/or text messages to determine what users interact with the user of the mobile device in the real world.

The memory 11 or memory 711 may be any known type of volatile memory or a non-volatile memory. The memory 11 or memory 711 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 11 or memory 711 may include an optical, magnetic (hard drive) or any other form of data storage device. The memory 11 or memory 711 may be located in a remote device or removable, such as a secure digital (SD) memory card.

The memory 11 or memory 711 may store computer executable instructions for dynamic content filtering and status policy embodiments discussed above. The controller 13 or controller 713 may execute computer executable instructions. The computer executable instructions may be included in computer code. The computer code may be written in any computer language, such as C, C++, C#, Java, Pascal, Visual Basic, Perl, HyperText Markup Language (HTML), JavaScript, assembly language, extensible markup language (XML) and any combination thereof.

The computer code may be stored in one or more tangible media or one or more non-transitory computer readable media for execution by the controller 13 or controller 713. A computer readable medium may include, but is not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 13 or controller 713 may include a general processor, digital signal processor, application specific integrated circuit, field programmable gate array, analog circuit, digital circuit, server processor, combinations thereof, or other now known or later developed processor. The controller 13 or controller 713 may be a single device or combinations of devices, such as associated with a network or distributed processing. Any of various processing strategies may be used, such as multi-processing, multi-tasking, parallel processing, remote processing, centralized processing or the like. The controller 13 or controller 713 may be responsive to or operable to execute instructions stored as part of software, hardware, integrated circuits, firmware, micro-code or the like.

The I/O interfaces 15, 715, 717 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection. For example, the I/O interfaces 15, 715, 717 may comprise a first communication interface devoted to sending data, packets, or datagrams and a second communication interface devoted to receiving data, packets, or datagrams. Alternatively, the I/O interfaces 15, 715, 717 may be implemented using a single communication interface. As used herein, the phrases "in communication" and "coupled" are defined to mean directly connected to or indirectly connected through one or more intermediate components. Such intermediate components may include both hardware and software based components.

Figure 8:
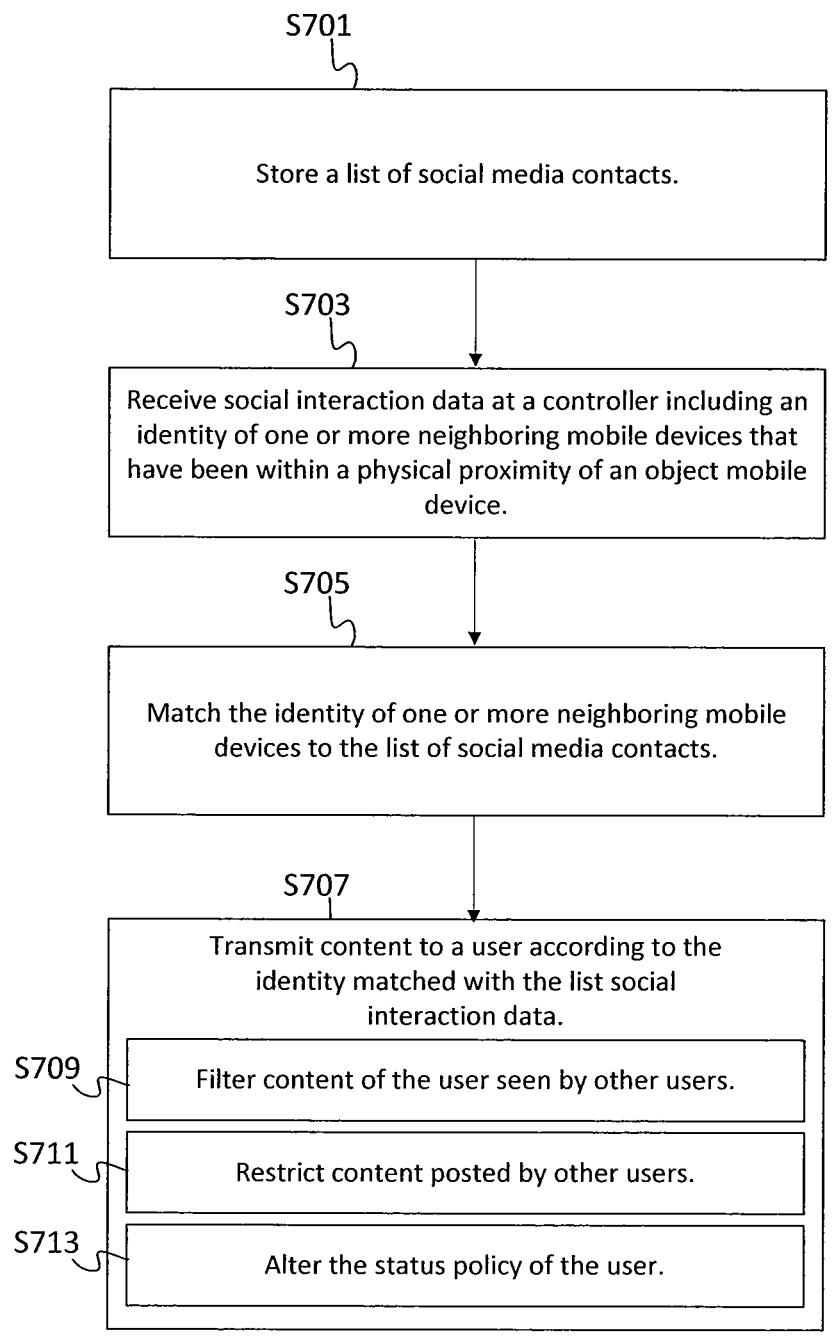
FIG. 8 illustrates one embodiment of a flow chart for dynamic content filtering or status policy.

FIG. 8 illustrates one embodiment of a flow chart for dynamic content filtering or status policy. At S701, a list of social media contacts is stored in memory. At S703, the controller receives social interaction data including an identity of one or more neighboring mobile devices. The identity may be a username on the social network service, a phone number, an internet protocol (IP) address, or another ID. The social interaction data includes neighboring mobile devices that have been within a predetermined distance to mobile device 101. At S705, the list of contacts is compared with the social interaction data. In other words, the controller matches the identity of one or more neighboring devices to the list of the social media contacts.

At S707, the controller, or communication interface, transmits content to a user according to the social interaction data. The user may be the user associated with the object mobile device, in which case the social media device 112 restricts the content of other users seen by the user associated with the object mobile device, as shown at act S709. The user may be associated with one of the neighboring mobile devices, in which case the controller filters the content associated with the user of the object mobile device that can be seen by the other users, some of which are associated with neighboring mobile devices, as shown at act S711. The controller may also alter the status policy of the user such that only those users with have interacted with the user in the real world within a predetermined time period are listed as available for chat or instant messaging, as shown at act S713.

Social network services take many forms, each allowing users to create social media postings. One form is a profile based social network service. In a profile based social network service, users create a profile as representations of themselves. The profiles often include photographs, likes and dislikes, and other user generated content. Many profiles also include a contact list used to connect to other users' profiles and access the other users' content. Profile-based social network services focus on the relationships among people, which includes groups of people who share interests or are friends for any reason. Most profile based social network services are accessed via the internet using a URL. The profile based social network establishes connections among users. Examples of profile based social networks include Facebook, MySpace, LinkedIn, and Bebo. Most profile based social networks include an area for comment by the user and by other users. In addition, many profile based social networks include a status message feature, which is an example of a microblog.

The microblog is another form of a social network service. A microblog entry includes an entry relatively small in content as compared with other sources. A microblog entry could consist of a sentence, a sentence fragment, an image, or an embedded video. The most common subject of microblog entries relate to what the user is doing at that moment or that day and what the user is thinking about. Examples of microblogs include the Google Buzz, Facebook news feed, Twitter, and Tumblr. Another form of a social network service is a traditional blog. A blog may relate to any variety of topics often in the form of a personal diary of commentary. Blogs may be accessed by a URL. In addition, some blog hosts provide usernames for user. Examples of blog hosts are Blogger, Wordpress, and Blogspot. Other hosts may be used, such as individually assigned websites.

Another form of a social network service is a business oriented social network service, which allows users to maintain a list of contact details of people they know and trust in business and maintain a profile of the user's own business experience. The business oriented social network service may also allow users to post messages. An example of a business oriented social network service is LinkedIn.

Many secondary social network applications provide combined access to one or more of the above social network services. For example, Tweetdeck is an application for Twitter, Facebook, LinkedIn, Google Buzz, Foursquare, and MySpace. In addition, mobile clients such as Tweetie provide similar functionality of smart phones or tablet devices. The embodiments discussed above may include use of secondary social network applications on the social media device 112 or a computer in communication with the social media device 112.

Various embodiments described herein can be used alone or in combination with one another. The foregoing detailed description has described only a few of the many possible implementations of the present embodiments. For this reason, this detailed description is intended by way of illustration, and not by way of limitation.

We claim:

1. A method comprising:
   storing a list of social media contacts of a user of an object mobile device;
   receiving, with a controller, social interaction data including one or more identities of one or more neighboring mobile devices determined to have been within an area defined by a predetermined distance from the object mobile device;
   matching the one or more identities of the one or more neighboring mobile devices to the list of social media contacts of the user of the object mobile device;
   in response to the matching, generating a social media news feed from social media contacts in the list that comprises news feed content either from only one or more first social media contacts in the list matched to the one or more identities of the one or more neighboring mobile devices, or from only one or more second social media contacts in the list not matched to the one or more identities of the one or more neighboring mobile devices; and
   transmitting the social media news feed to a computing device accessed by the user of the object mobile device for display of the social media news feed.

2. The method of claim 1, wherein the social interaction data is received from the object mobile device and the social interaction data is indicative of being collected by the object mobile device in response to a user input.

3. The method of claim 1, wherein the social interaction data is received from the object mobile device and the social interaction data is indicative of being collected by the object mobile device dynamically based on signals received from the one or more neighboring mobile devices.

4. The method of claim 3, wherein the signals are generated using radio frequency identification, ad-hoc network, Wi-Fi, or infrared.

5. The method of claim 1, wherein the social interaction data includes an amount of time each of the one or more neighboring devices is within the area defined by the predetermined distance from the object mobile device.

6. The method of claim 1, wherein the social interaction data is received at the controller from a memory, the method further comprising:
   receiving, at a communication interface, location data from the object mobile device and the one or more neighboring devices;
   calculating the social interaction data from the location data; and
   storing the social interaction data in the memory.

7. The method of claim 1, further comprising:
   in response to the matching, applying a policy to social media content provided by the user of the object mobile device that limits access to the social media content to only the one or more first social media contacts in the list matched to the one or more identities of the one or more neighboring mobile devices.

8. The method of claim 1, wherein the computing device comprises a first computing device, the method further comprising:
   in response to the matching:
      communicating an available status of the user of the object mobile device to one or more second computing devices accessed by the one or more first social media contacts in the list matched to the one or more identities of the one or more neighboring devices; and
      communicating an unavailable status of the user of the object mobile device to one or more third computing devices accessed by the one or more second social media contacts in the list not matched to the one or more identities of the one or more neighboring devices.

9. An apparatus comprising:
   a memory storing social media content for a social media display viewed by a user of an object mobile device; and
   a controller configured to:
      receive social interaction data including one or more identities of one or more neighboring mobile devices determined to have been within an area defined by a predetermined distance from the object mobile device;
      identify one or more first social media contacts in a contact list of the user as being associated with the one or more identities of the one or more neighboring mobile devices and one or more second social media contacts in the contact list as not being associated with the one or more identities of the one or more neighboring mobile devices; and
      in response to the identification, filter the social media content to generate a social media news feed from social media contacts in the contact list, wherein the social media news feed comprises news feed content either from only the one or more first social media contacts identified as being associated with the one or more identities of the one or more neighboring mobile devices, or from only one or more second social media contacts in the contact list identified as not being associated with the one or more identities of the one or more neighboring mobile devices.

10. The apparatus of claim 9, wherein the social interaction data is received from the object mobile device, the social interaction data indicative of being collected by the object mobile device in response to a user input.

11. The apparatus of claim 9, wherein the social interaction data received is indicative of being collected dynamically by the object mobile device based on signals received from the one or more neighboring mobile devices.

12. The apparatus of claim 9, wherein the controller is further configured to calculate the social interaction data from location data received from the object mobile device and the one or more neighboring devices and send the social interaction data to the memory.

13. The apparatus of claim 9, wherein the social media content comprises a first social media content, and wherein the controller is configured to apply a policy to a second social media content that is provided by the user of the object mobile device, wherein the policy limits access to the second social media content to the one or more first social media contacts in the contact list identified as being associated with the one or more identities of the one or more neighboring mobile devices.

14. The apparatus of claim 9, wherein the controller is further configured to:
communicate an available status of the user of the object mobile device to one or more first computing devices accessed by the one or more first social media contacts associated with the one or more identities of the one or more neighboring mobile devices; and
communicate an unavailable status of the user of the mobile device to one or more second computing devices accessed by the one or more second social media contacts identified as not being associated with the one or more identities of the one or more neighboring mobile devices.

15. A non-transitory computer readable medium encoded with software comprising computer executable instructions and when the software is executed operable to:
receive location data from a plurality of mobile devices comprising an object mobile device and one or more neighboring mobile devices;
calculate social interaction data for the plurality of mobile devices that identifies one or more neighboring mobile devices determined to have been within a predetermined distance of the object mobile device for a predetermined period of time;
match one or more first contacts in a social media contact list of a user of the object mobile device to the one or more neighboring mobile devices identified by the calculated social interaction data; and
provide content to a computing device accessed by the user that limits a news feed from contacts in the social media contact list of the user to news feed content either from only the one or more first social media contacts matched to the one or more neighboring mobile devices, or from only one or more second social media contacts in the social media contact list not matched to the one or more neighboring mobile devices.

16. The non-transitory computer readable medium of claim 15, wherein the content comprises first content, and wherein the software, when executed, is further operable to:
restrict access to second content provided by the user of the object mobile device to only the first social media contacts matched to the one or more neighboring mobile devices that have been within the predetermined distance for the predetermined period of time.

17. The non-transitory computer readable medium of claim 15, wherein the computing device comprises a first computing device, and wherein the software, when executed, is further operable to:
communicate an available status of the user of the object mobile device to the one or more first social media contacts matched to the one or more neighboring mobile devices; and
communicate an unavailable status of the user of the object mobile device to the one or more second social media contacts not matched to the one or more neighboring mobile devices.

18. The method of claim 1, wherein the predetermined distance is based on one or more signal strengths of one or more signals communicated between the one or more neighboring mobile devices and the object mobile device.

* * * * *